(12) United States Patent
Proksa et al.

(10) Patent No.: US 10,708,690 B2
(45) Date of Patent: Jul. 7, 2020

(54) METHOD OF AN AUDIO SIGNAL CORRECTION

(71) Applicant: YAYUMA AUDIO SP. Z.O.O., Jaworzno (PL)

(72) Inventors: Jaroslaw Proksa, Jaworzno (PL); Jerzy Pona, Biala (PL); Marcin Skrzypczak, Tychi (PL)

(73) Assignee: YAYUMA AUDIO SP. Z.O.O., Jaworzno (PL)

( * ) Notice: Subject to any disclaimer, the term of this patent is extended or adjusted under 35 U.S.C. 154(b) by 0 days.

(21) Appl. No.: 15/759,183

(22) PCT Filed: Sep. 2, 2016

(86) PCT No.: PCT/EP2016/070708
§ 371 (c)(1),
(2) Date: Mar. 9, 2018

(87) PCT Pub. No.: WO2017/042098
PCT Pub. Date: Mar. 16, 2017

(65) Prior Publication Data
US 2018/0255397 A1 Sep. 6, 2018

(30) Foreign Application Priority Data
Sep. 10, 2015 (CH) ................... 01310/15

(51) Int. Cl.
*H04R 3/04* (2006.01)
*H04R 3/06* (2006.01)
*G05B 11/42* (2006.01)

(52) U.S. Cl.
CPC .............. *H04R 3/06* (2013.01); *G05B 11/42* (2013.01); *H04R 3/04* (2013.01)

(58) Field of Classification Search
None
See application file for complete search history.

(56) References Cited

U.S. PATENT DOCUMENTS

| | | | |
|---|---|---|---|
| 5,668,747 A * | 9/1997 | Ohashi | G06F 17/10 708/322 |
| 2007/0230556 A1 | 10/2007 | Nakano | |
| 2009/0319066 A1 | 12/2009 | Tsuji et al. | |
| 2011/0103625 A1* | 5/2011 | Srinivasan | G10L 21/0208 381/312 |
| 2012/0128178 A1 | 5/2012 | Fujii | |
| 2013/0066453 A1 | 3/2013 | Seefeldt | |
| 2013/0251164 A1 | 9/2013 | Gautama | |

(Continued)

OTHER PUBLICATIONS

International Search Report and Written Opinion for related PCT application No. PCT/EP2016/070708, dated Dec. 5, 2016; 15 pages.

(Continued)

*Primary Examiner* — Kenny H Truong
(74) *Attorney, Agent, or Firm* — Procopio, Cory, Hargreaves & Savitch LLP (57) ABSTRACT

A method is provided for a correction of an audio signal (AS) which is formed using an electroacoustic transducer. The method comprises producing a corrected audio signal (CAS) based on the audio signal (AS) according to the formal I: in which the coefficient B amounts from −10 to 0 and the coefficient C amounts from 0 to 0.04.

12 Claims, 4 Drawing Sheets

(56) References Cited

U.S. PATENT DOCUMENTS

2014/0064502 A1    3/2014  Hoang Co Thuy
2014/0241546 A1*   8/2014  Matsumoto .............. H04R 3/10
                                                          381/86

OTHER PUBLICATIONS

Raghunath, Srivatsa, "Digital Loop Exemplified", Texas Instruments Application Report, Dec. 2011, pp. 1-20.
"Implementation of PID controllers on the Motorola DSP56000/DSP56001. Part 1.", Microprocessors and Microsystems Application Note, Jul./Aug. 1991, pp. 321-331; vol. 15, No. 6; London, England.
Notification Concerning Transmittal of International Preliminary Report on Patentability for PCT App No. PCT/EP2016/070708 dated Mar. 22, 2018, 10 pgs.

* cited by examiner

METHOD OF AN AUDIO SIGNAL CORRECTION

CROSS-REFERENCE TO RELATED APPLICATIONS

This application is a U.S. National Stage entry of PCT Application No: PCT/EP2016/070708 filed Sep. 2, 2016, which claims priority to Swiss Patent Application No. 01310/15, filed Sep. 10, 2015, the contents of which are incorporated herein by reference.

The present invention relates to a correction of an audio signal in order to improve a sonic fidelity of an acoustic signal reproduced based on this audio signal using an electroacoustic transducer. The present invention is in particular related with recording an acoustic signal in a form of an audio signal and reproducing an acoustic signal from an audio signal by means of an electromagnetic and magnetoelectric dynamic electroacoustic transducers.

Systems of sound recording and reproduction are still being developed in a result of research and development activities carried out in laboratories by big companies as well as by small one man firms. Many skilled technicians is carrying out continuous researches to develop increasingly improved solutions of audio systems enabling for more and more faithful firstly recording an original acoustic signal (for example an acoustic sound originating from a natural sound source such as for example human voice and sound of classical musical instruments and the like) into an audio signal, and then reproducing from such an audio signal an acoustic signal that possibly accurately reflects the original acoustic signal (in particular also reflects the natural character of the original acoustic signal, such as for example the character of a human voice or classical musical instruments and the like).

For a conversion of an acoustic pressure (a sound) into an electric signal (generated for example in a microphone and an electric guitar pickup and the like) and for a conversion of an electric signal into an acoustic signal (generated for example in a loudspeaker, a headphone, a hydrophone and the like), electroacoustic transducers are used.

An operation of the great majority of presently used electroacoustic transducers is based on an interaction between a conductor of electricity (substantially in a form of a coil) and a magnetic field surrounding the conductor.

With respect to a construction, such electroacoustic transducers may be divided into electromagnetic transducers and magnetoelectric dynamic transducers.

Amplitude-frequency characteristics of electroacoustic transducers are dependent on a great number of parameters such as for example a mechanical construction, materials used for producing a membrane, a geometry of the whole transducer arrangement, additionally introduced resonances or attenuations and the like. All these parameters are purposively utilized by manufacturers of electroacoustic transducers and have critical influence on the sound of a reproduced acoustic signal.

It is commonly regarded that the weakest (i.e. introducing the greatest distortions) element of audio systems is a speaker (a headphone). Therefore one of the main development directions of audio systems relates to attempts of developing such a modification of a shape of a recorded acoustic signal that compensates negative but unavoidable features of an electroacoustic transducer (a loudspeaker) such as for example nonlinearity, internal resonances, the frequencies of the their own, parameter variation in time and the like.

One of such solutions is an algorithm disclosed in the patent application US2014064502.

Modifications of an audio signal shape before a transmission thereof to an amplifier driving a loudspeaker may be realized in the digital domain by a change of a source recording content or in the analog domain by a change of an audio signal shape by means of analog filters.

The present invention relates to an algorithm of modification of a source original audio signal before a transmission thereof to an amplifier driving an electroacoustic transducer (for example a loudspeaker) that may be realized both in the digital domain as well as in the analog domain.

All magnetoelectric transducers and electromagnetic transducers, irrespective of constructional solutions and materials used therein, operate based on the same elementary physical principles.

The transducers of an electric signal (an electric current flowing through the transducer coil) into a movement of the transducer membrane, i.e. into an acoustic pressure (such as loudspeakers and headphones), work in such a manner that an electric current of a current intensity I variable in a manner representing an acoustic signal (therefore the electric current constitutes an audio signal) is flowed through a coil of the total length L of its conductor wire, wherein the coil is fixedly coupled with the transducer membrane and located in a strong magnetic field of magnetic induction B. The flow of the electric current I induces force F acting upon the coil (and thus also upon the membrane) and having the value defined by the formula: $F = I \times L \times B$. In an extreme condition, if the current I has a constant value then the force F is also constant and therefore the transducer membrane displacement x is consequently also constant.

Figure 1:
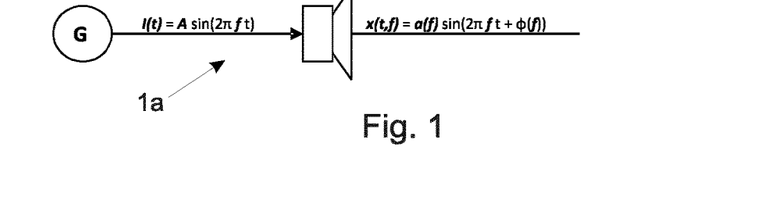
FIG. 1 illustrates an audio system.

If the electroacoustic transducer is energized from a generator G with the electrical current $I(t) = A \sin(2\pi f t)$ of a constant amplitude A and a variable frequency f from the range of 1 Hz-30 kHz in an audio system $1a$ presented in FIG. 1, then the amplitude of the membrane displacements x is defined by the formula: $x(t,f) = a(f) \sin(2\pi f t + \varphi(f))$, in which the coefficients $a(f)$ i $\varphi(f)$ vary along with a change of frequency f.

Figure 2:
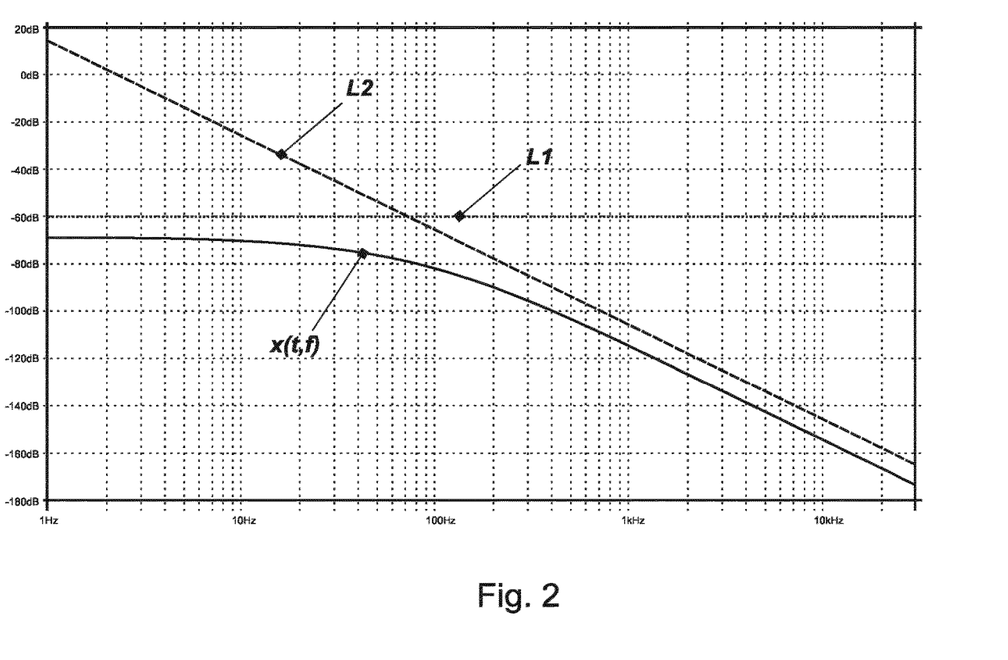
FIG. 2 illustrates an amplitude-frequency characteristics x(t,f) (the solid line) of an exemplary commercially available electroacoustic transducer BEYERDYNAMIC DT880.

Figure FIG. 2 presents an amplitude-frequency characteristics $x(t,f)$ (the solid line) of an exemplary commercially available electroacoustic transducer BEYERDYNAMIC DT880.

In the range of low acoustic frequencies the characteristics $x(t,f)$ is parallel to the line denoted as L1 (the dashed line)—i.e. the membrane displacement x reflects the shape of the electric current I flowing through the transducer coil. The line L1 represents the characteristics of a constant amplitude in the whole frequency range.

The line L2 (the dotted line) represents the course of an amplitude variability requisite for obtaining the condition of constancy of kinetic energy of the mass propelled by the force of a constant amplitude in the whole frequency range. The velocity v of the membrane as well as the membrane kinetic energy proportional to the value $v^2$, increases along with a frequency increase. As the energy supplied to the membrane by the electric current I is constant in the whole frequency range, thus the membrane kinetic energy has also to remain constant, and therefore the amplitude of oscillations has to decrease. In the range of high acoustic frequencies, the characteristics $x(t,f)$ is parallel relative to the line L2.

Figure 3:
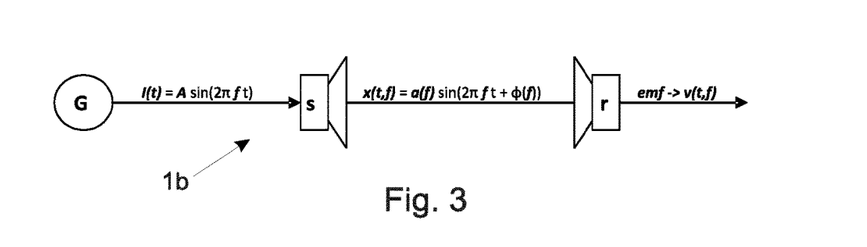
FIG. 3 illustrates an audio system.

Figure FIG. 3 presents an audio system $1b$ comprising two identical electroacoustic transducers s and r arranged in a substantially ideal medium ensuring that the membranes of both transducers s, r vibrate substantially ideally in the same manner. Vibrations of the transducer r membrane induce in the coil of this transducer r an electromagnetic force emf=v(t,f)×B×L.

Figure 4:
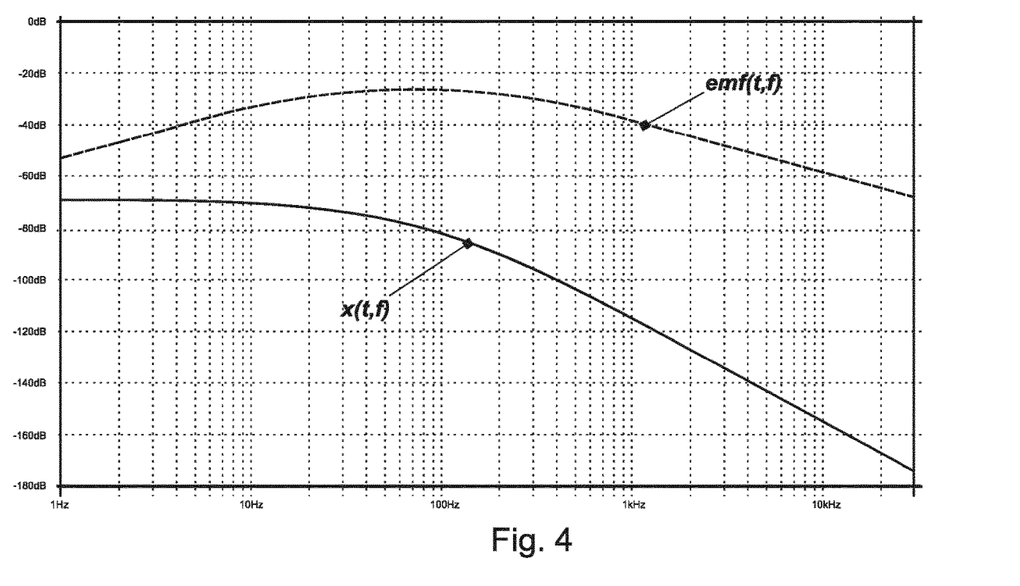
FIG. 4 illustrates an amplitude-frequency characteristics of the electric signal emf(t,f)

Figure FIG. 4 presents the an amplitude-frequency characteristics of the electric signal emf(t,f) (the solid line). As depicted, even though the transducers s and r are identic and their membranes vibrate identically, the amplitude-frequency characteristics of the electric signal emf generated by the transducer r has the shape that does not mirror the membrane movement x(t,f) (the solid line). This dissonance results from that the electromagnetic force emf is proportional relative to the velocity v of the membrane movement, but is not proportional relative to the coil displacement (and thus also the membrane displacement) x.

Figure 5:
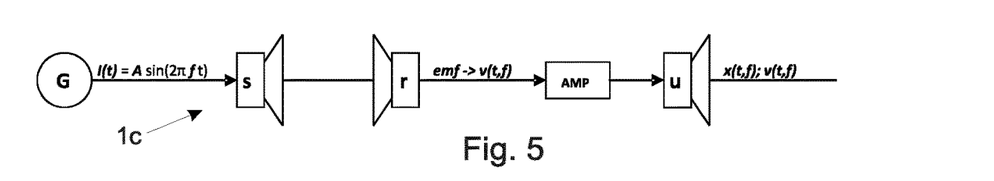
FIG. 5 illustrates an audio system.

Figure FIG. 5 presents an audio system 1c that is the audio system 1b of FIG. 3 that additionally comprises the third electroacoustic transducer u supplied from the amplifier AMP to which the electric signal emf is supplied from the second transducer r. The third electroacoustic transducer u is identically the same as the transducers s, r. from FIG. 3. Supplying the transducer u with the signal from the transducer r shall result in producing, according to elementary physical principles, a subsequent deformation of the characteristics of the signal being reproduced that is illustrated in figure FIG. 6.

Figure 6:
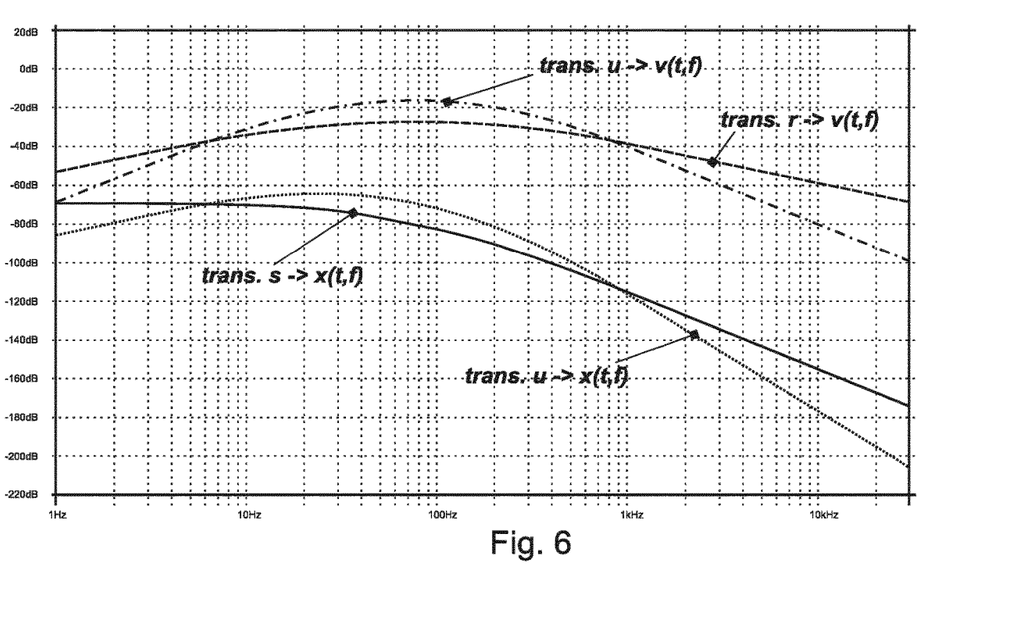
FIG. 6 illustrates that the amplitude-frequency transmission characteristics trans. u->v(t,f) of membrane movement velocity of the sound reproducing transducer u is substantially different than the amplitude-frequency transmission characteristics trans. r->v(t,f) of membrane movement velocity of the sound recording transducer r.

Figure FIG. 6 demonstrates the fact that in all audio systems known from the prior art (as schematically illustrated in FIG. 5) used for a sound reproduction, the amplitude-frequency transmission characteristics trans. u→v(tf) (the dot-and-dash line) of membrane movement velocity of the sound reproducing transducer u (such as a loudspeaker or a headphone) is substantially different than the amplitude-frequency transmission characteristics trans. r→v(t,J) (the dashed line) of membrane movement velocity of the sound recording transducer r (a transducer generating an audio signal from an acoustic signal, such as a microphone).

In a consequence, the amplitude-frequency transmission characteristics trans. u→x(tf) (the dotted line) of membrane movement (the membrane position in the function of time) of the sound reproducing transducer u differs substantially from the transmission characteristics trans. s→x(t,J) (the solid line) of membrane movement of the transducers that generates the source original acoustic signal.

Figure 7:
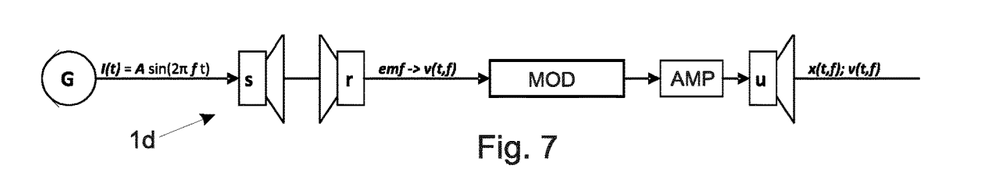
FIG. 7 illustrates an audio system.

Based on the above indicated observations, the object of the present invention was to provide a method of a correction (modification) of an audio signal supplied by the transducer r to the transducer u, considering the fact that the coil of an electroacoustic transducer energized by an electric current I(t) converts the shape of this current I(t) into the position x(t,J) of the coil, whereas the same coil itself when dislocating under the influence of a mechanical excitation (obtained for example with using a membrane and acoustic pressure) converts an electromagnetic force emf into the velocity v(t,f) of this coil. Such a correction or modification is to be realized between the sound recording transducer r and the sound reproducing transducer u (advantageously before the amplifier AMP) and is illustrated in an audio system 1d illustrated in figure FIG. 7 as a symbolic functional block MOD.

Figure 8:
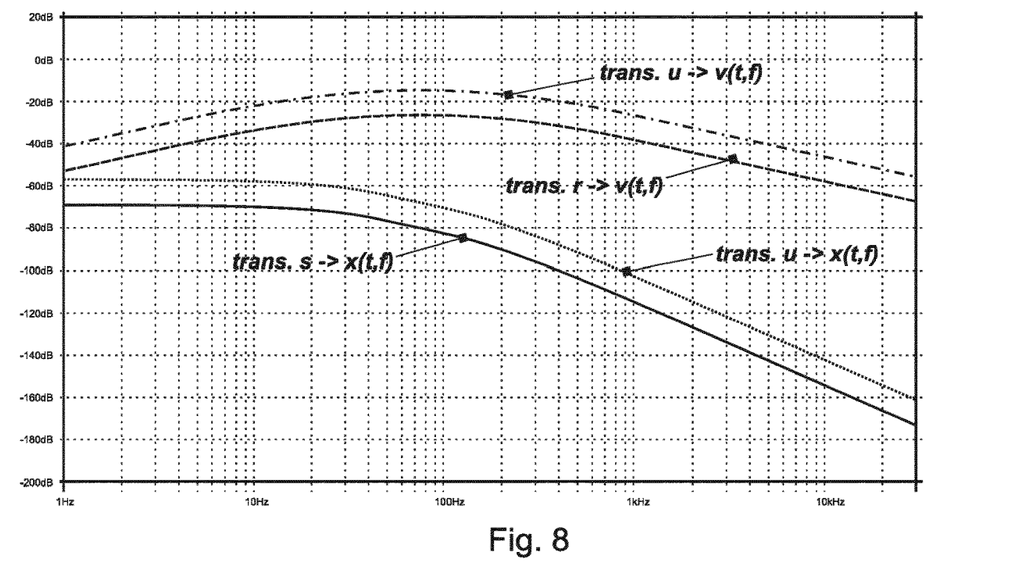
FIG. 8 illustrates the transmission characteristics trans. u->v(t,f) of the coil velocity of the sound reproducing transducer u should have the shape that is possibly similar to the shape of the transmission characteristics trans. r->v(t,f) of the coil of the acoustic pressure transducer r.

Such a correction or modification should provide that the movement transmission characteristics trans. u→x(tf) (the dotted line) of the sound reproducing transducer u coil (membrane) has the shape that is possibly similar to (ideally identical as) the shape of the movement transmission characteristics trans. s→x(tf) (the solid line) of the coil (membrane) of the transducer s constituting a sound source, and in an ideal case should enable for achieving characteristics corrections as depicted in figure FIG. 8. As visible in FIG. 8, furthermore the transmission characteristics trans. u→v(tf) (the dot-and-dash line) of the coil (membrane) velocity of the sound reproducing transducer u (a loudspeaker, a headphone) should have the shape that is possibly similar to (ideally identical as) the shape of the transmission characteristics trans. r→v(t,J) (the dashed line) of the coil (membrane) of the acoustic pressure transducer r (a microphone).

The inventors surprisingly found out that the above described and illustrated in FIG. 8 desired corrections of the characteristics may be achieved by correcting an audio signal (AS) recorded using an electroacoustic transducer into a corrected audio signal (CAS) according to the following formula I:

$$CAS(t) = AS(t) + B\int AS(t)dt + C\frac{dAS(t)}{dt} \quad (I)$$

in which
the coefficient B amounts from −10 to 0, preferably amounts from −5 to −1, and particularly preferably amounts about −3.2;
the coefficient C amounts from 0 to 0.04, preferably amounts from 0.005 to 0.020; particularly preferably amounts about 0.01.

Concerning the above, according to the present invention it is provided a method of a correction of an audio signal AS formed using an electroacoustic transducer, in particular an electromagnetic or magnetoelectric dynamic electroacoustic transducer, characterized in that it comprises producing a corrected audio signal CAS, usable for high fidelity sound reproduction by means of an electroacoustic transducer, based on the audio signal AS according to the following formula I:

$$CAS(t) = AS(t) + B\int AS(t)dt + C\frac{dAS(t)}{dt} \quad (I)$$

in which
the coefficient B amounts from −10 to 0, preferably amounts from −5 to −1, and particularly preferably amounts about −3.2;
the coefficient C amounts from 0 to 0.04, preferably amounts from 0.005 to 0.020; and particularly preferably amounts about 0.01.

Furthermore the ratio of the coefficient B to the coefficient C preferably amounts from −50 to −1000, and more preferably amounts from −250 to −350.

According to the present invention it is also provided a method of a reproduction of an acoustic signal Sout using an electroacoustic transducer on the basis of an audio signal AS formed using an electroacoustic transducer, characterized in that it comprises the steps of:
a) producing a corrected audio signal CAS based on the audio signal AS according to the following formula I:

$$CAS(t) = AS(t) + B\int AS(t)dt + C\frac{dAS(t)}{dt} \quad (I)$$

in which
the coefficient B amounts from −10 to 0, preferably amounts from −5 to −1, and particularly preferably amounts about −3.2;

the coefficient C amounts from 0 to 0.04, preferably amounts from 0.005 to 0.020; and particularly preferably amounts about 0.01;
b) producing an electric control signal (ECS) corresponding to the corrected audio signals CAS, preferably by means of an amplification of the corrected audio signal CAS;
c) energizing the electroacoustic transducer with the electric control signal ECS.

Furthermore the ratio of the coefficient B to the coefficient C preferably amounts from −50 to −1000, and more preferably amounts from −250 to −350.

In the preferred realization of this method of an acoustic signal reproduction, the electric control signal ECS is a current control signal ECSi of the current time course shape corresponding to the time course shape of the corrected audio signal CAS.

Furthermore according to the present invention it is also provided a method of a conversion of an acoustic signal (Sin) into an audio signal by means of an electroacoustic transducer, characterized in that it comprises producing a corrected audio signal CAS, usable for high fidelity sound reproduction by means of an electroacoustic transducer, based on the audio signal AS generated by the electroacoustic transducer in a response to the given acoustic signal Sin received by the transducer, according to the following formula I:

$$CAS(t) = AS(t) + B \int AS(t)dt + C\frac{dAS(t)}{dt} \quad (I)$$

in which
the coefficient B amounts from −10 to 0, preferably amounts from −5 to −1, and particularly preferably amounts about −3.2;
the coefficient C amounts from 0 to 0.04, preferably amounts from 0.005 to 0.020; and particularly preferably amounts about 0.01.

In this method the ratio of the coefficient B to the coefficient C preferably amounts from −50 to −1000, and more preferably amounts from −250 to −350.

Finally according to the present invention it is provided a method of a recording of an acoustic signal Sin in a form of an audio signal using an electroacoustic transducer, characterized in that it comprises the steps of:
a) producing a corrected audio signal CAS, usable for high fidelity sound reproduction by means of an electroacoustic transducer, based on the audio signal AS generated by an electroacoustic transducer in a response to a given acoustic signal Sin received by the transducer, according to the following formula I:

$$CAS(t) = AS(t) + B \int AS(t)dt + C\frac{dAS(t)}{dt} \quad (I)$$

in which
the coefficient B amounts from −10 to 0, preferably amounts from −5 to −1, and particularly preferably amounts about −3.2;
the coefficient C amounts from 0 to 0.04, preferably amounts from 0.005 to 0.020; and particularly preferably amounts about 0.01; and
b) storing the corrected audio signal (CAS) on a storage medium.

Furthermore the ratio of the coefficient B to the coefficient C preferably amounts from −50 to −1000, and more preferably amounts from −250 to −350.

An audio signal according to the present invention is to be understood as an any signal the time course of certain parameter(s) of which constitutes(constitute) a representation of a time course of an acoustic signal (acoustic pressure) and that has been obtained on the basis of the output signal (for example commonly the transducer output voltage) being generated by an electroacoustic transducer during receiving this given acoustic signal (acoustic pressure), i.e. during influencing the transducer membrane (and thus also the transducer coil) by the acoustic pressure signal.

In a typical case an audio signal shall be a signal corresponding to a time course of an output voltage of an electroacoustic transducer generated in a response to the acoustic signal received be the transducer.

The proposed according to the present invention correction of an original audio signal is relatively simple and surprisingly is efficiently operative for all types of electroacoustic transducers, independently from the particular model of the transducer used for recording an audio signal. Unexpectedly the present invention tremendously increases fidelity of an acoustic signal reproduced and an audio signal recorded using electromagnetic transducers, magnetoelectric dynamic transducers, piezoelectric transducer as well as capacitive transducers. Therefore the solutions according to the present invention are extremely universal.

For electromagnetic and magnetoelectric dynamic transducers, in consideration of physical principles on which their operation is based, the positive influence of the audio signal correction according to the present invention is particularly significant in a case where for the control of an output electroacoustic transducer a current control signal is used. An appropriate current control signal may be generated using a current source, such as for example an analog current source, an audio current amplifier or a voltage source corrected to obtain a current output signal, that is controlled by the corrected audio signal according to the present invention.

Furthermore the better the quality of a given transducer used is (that among other things is manifested by a relatively small nonlinearity of an amplitude-frequency transmission characteristics), the better correction results are provided by the present invention.

The correction of an audio signal according to the present invention may be used during an acoustic signal reproduction from a given audio signal if during a recording of this given audio signal no such a correction has been carried out, or preferably during a given audio signal recording or storing, whereby the correction is carried out only once and the results of the correction are available also for all sound reproducing devices using this corrected audio signal that are not provided with any implementation of the solutions according to the present invention.

The audio signal corrected according to the present invention may be directly reproduced locally using an electroacoustic transducer (for example the voice of an opera singer may be converted into an audio signal that is corrected according to the present invention and in the version corrected by the solutions of the present invention may be used for local singer voice reproduction by means of the opera sound system loudspeakers; wherein the quality of voice reproduction provided by audio systems known for the prior art does not enable for such a real time opera singer voice reproduction) or may be reproduced remotely by transmitting it by means of communication links (for example wireless radio communication links) to a number of remotely located receivers provided with appropriate loudspeakers for sound reproduction.

For a skilled technician it is obvious that if during producing of a given original audio signal that is to be subjected to the correction methods of the present invention, strong modifications of normal amplitude-frequency characteristics of input electroacoustic transducers (microphones) have been introduced (for example by acoustic correction, such as for example an equalization comprising attenuation and/or amplification of certain frequency components of an original audio signal), then in some cases the coefficients B and C in the formula I of the present invention may also have to be modified.

DESCRIPTION OF THE DRAWINGS

The exemplary embodiments of the present invention are presented below in connection with the attached drawings on which.

Figure 9:
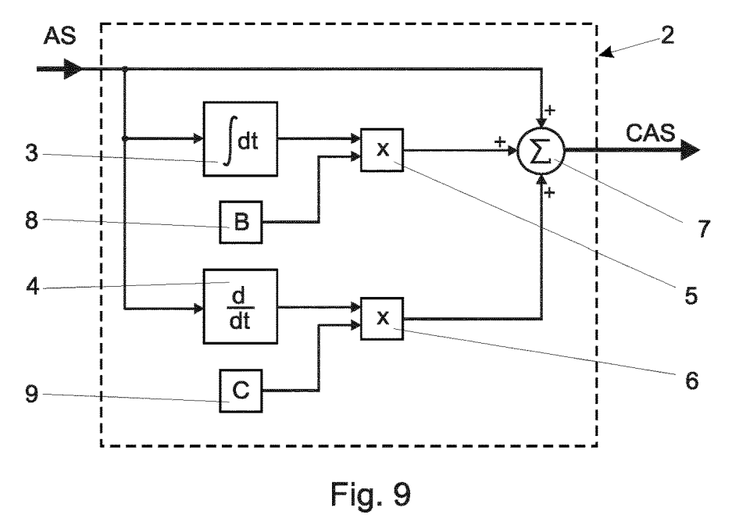
FIG. 9 presents schematically an exemplary correction block realizing an exemplary method of an audio signal correction according to the present invention.

All solutions proposed according to the present invention are based on the universal method of an audio signal correction illustrated in FIG. 9. The gist of this correction method according to the present invention is represented by a correction block 2 comprising a integration block 3 and a differentiation block 4 connected to the input of the correction block 2, two multiplication blocks 5, 6 and a summation block 7.

The summation block 7 has two inputs connected respectively to the input of the correction block 2 and the outputs of the multiplication blocks 5, 6. The integration block 3 produces at its output a signal constituting the integral of the input audio signal AS supplied to the input of the correction block 2. The differentiation block 4 produces at its output a signal constituting the derivative of the input audio signal AS supplied to the input of the correction block 2. One input of the multiplication block 5 is connected to the output of the integration block 3, and one input of the multiplication block 6 is connected to the output of the differentiation block 4. The remaining second inputs of the multiplication blocks 5, 6 are connected respectively to coefficient blocks 8, 9 providing multiplier factors B and C for the multiplications of the output signals respectively from the blocks 2, 3. The coefficient B amounts from −10 to 0, preferably amounts from −5 to −1, and particularly preferably amounts about −3.2. The coefficient C amounts from 0 to 0.04, preferably amounts from 0.005 to 0.020; and particularly preferably amounts about 0.01. Furthermore the ratio of the coefficient B to the coefficient C preferably amounts from −50 to −1000, and more preferably amounts from −250 to −350.

In the method of an audio signal correction according to the present invention, the original audio signal AS originating from any arbitrary source of audio signal (such as for example a CD player or a radio tuner) is subjected to an integration operation and an differentiation operation in the blocks 2 and 3. The method of a realization of these operations is absolutely arbitrary and may be carried out using any appropriate hardware and/or software means. Subsequently the signal representing the integral of the original audio signal AS is being multiplied by the coefficient B, and the signal representing the derivative of the original audio signal AS is being multiplied by the coefficient C. Finally in a result of the summation of the original audio signal AS and the integral and derivative thereof multiplied by the above defined coefficients B and C, the correction block 2 produces at its output the final corrected audio signal CAS based on the original audio signal AS according to the following formula I:

$$CAS(t) = AS(t) + B \int AS(t)dt + C\frac{dAS(t)}{dt} \qquad (I)$$

in which the coefficient B amounts from −10 to 0, preferably amounts from −5 to −1, and particularly preferably amounts about −3.2;

the coefficient C amounts from 0 to 0.04, preferably amounts from 0.005 to 0.020; and particularly preferably amounts about 0.01.

Furthermore, the ratio of the coefficient B to the coefficient C preferably amounts from −50 to −1000, and more preferably amounts from −250 to −350.

Figure 10:
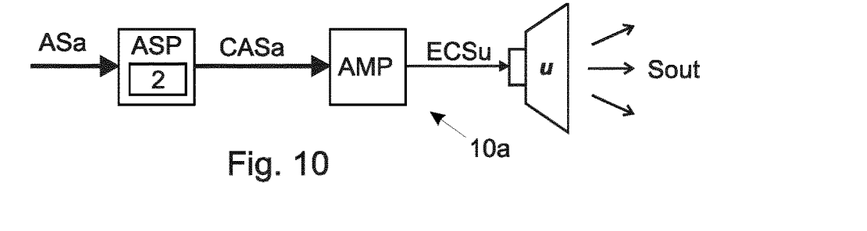
FIG. 10-12 present schematically audio systems that may be employed for realization of the methods according to the present invention.
Figure 11:
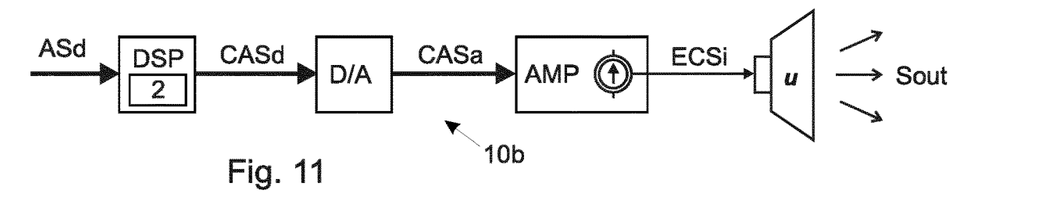
Figure 12:
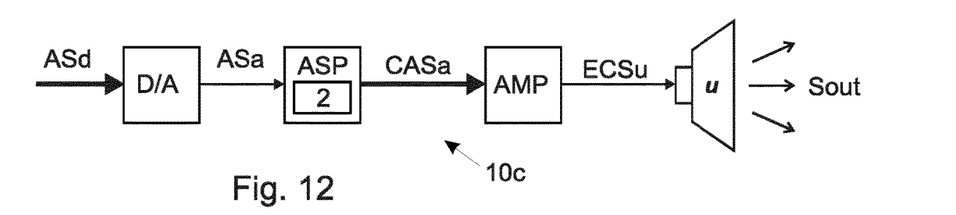

Figures FIGS. 10-12 present block schemes of exemplary audio signals that may be used for a realization of a method of sound reproducing by means of an electroacoustic transducer on the basis of an audio signal.

The system 10a of FIG. 10 is used for reproducing an analog audio signal ASa and comprises an analog signal processor ASP, in which the correction block 2 of FIG. 9 is implemented and to the output of which an amplifier AMP is connected. The amplifier AMP energizes the loudspeaker u comprising the output dynamic electroacoustic transducer. The correction block 2 of the processor ASP transforms the input analog audio signal ASa into the corrected audio signal CASa having also an analog form according to the formula I:

$$CASa(t) = ASa(t) + B \int ASa(t)dt + C\frac{dASa(t)}{dt}, \qquad (I)$$

in which the coefficient B amounts from −10 to 0, preferably amounts from −5 to −1, and particularly preferably amounts about −3.2; and the coefficient C amounts from 0 to 0.04, preferably amounts from 0.005 to 0.020; and particularly preferably amounts about 0.01. Furthermore, the ratio of the coefficient B to the coefficient C preferably amounts from −50 to −1000, and more preferably amounts from −250 to −350. Subsequently the analog corrected audio signal CASa is being amplified in the amplifier AMP producing at its output an electric voltage control signal ECSu having the voltage time course shape corresponding to the time course shape of the corrected audio signal CASa. The control signal ECSu is subsequently supplied to the transducer u reproducing an acoustic signal recorded in the form of the original audio signal AS by emitting an output acoustic signal Sout of high fidelity.

The system 10b of FIG. 11 is used for a sound reproduction on the basis of a digital audio signal ASd and comprises a digital signal processor DSP in which the correction block 2 of FIG. 9 is implemented, a digital-to-analog converter D/A and an amplifier AMP energizing an output dynamic loudspeaker u. The correction block 2 of the processor DSP transforms the input digital audio signal ASd into the corrected audio signal CASd having also a digital form according to the formula I:

$$CASd(t) = ASd(t) + B \int ASd(t)dt + C\frac{dASd(t)}{dt}, \qquad (I)$$

in which the coefficient B amounts from −10 to 0, preferably amounts from −5 to −1, and particularly preferably amounts about −3.2; and the coefficient C amounts from 0 to 0.04, preferably amounts from 0.005 to 0.020; and particularly preferably amounts about 0.01. Furthermore, the ratio of the coefficient B to the coefficient C preferably amounts from −50 to −1000, and more preferably amounts from −250 to −350. Integration and differentiation operations of the digital signal ASd are obviously realized using appropriate integration and differentiation algorithms especially designed for digital discrete signals. Therefore general universal mathematical symbols of an integration $\int$ and a differentiation $$\frac{d}{dt}$$

in the formula I are to be understood only as symbolical indication of operations of integration and differentiation regardless of particular algorithms of realization thereof. In particular case where the integration of a digital audio signal is realized by a summation of all consecutive previous samples of this signal, the symbol $\int$ should be replaced by the symbol $\Sigma$. The corrected audio signal CASd is subsequently being transformed in the converter D/A into an analog corrected audio signal CASa that is further being amplified in the amplifier AMP. On the basis of the signal CASa the amplifier AMP comprising a current source produces an output electric control signal ECSi for the loudspeaker u. The output control signal ECSi has a form of a current signal of the current time course shape corresponding to the time course shape of the analog corrected audio signal CASa. An employment of the control signal ECSi of the current character additionally increases fidelity of an acoustic signal Sout being reproduced by the loudspeaker u.

The audio system 9c of FIG. 12 is used for a sound reproduction according to the method of the present invention from a digital audio signal ASd using an analog signal processor ASP. This audio system 9c is the audio system 9a of FIG. 9 which additionally comprises an input digital-to-analog converter D/A converting an input digital audio signal ASd into an analog representation thereof ASa.

Figure 13:
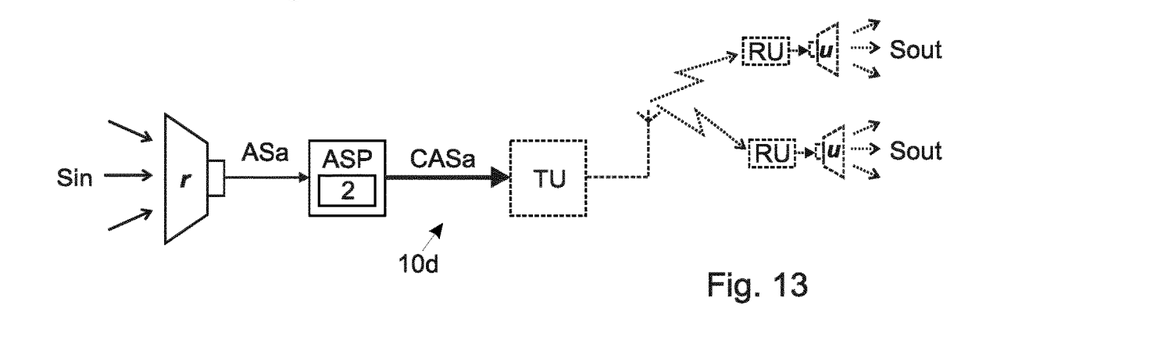
FIG. 13 presents schematically an exemplary audio system for a realization of the method of a conversion of an acoustic signal into an audio signal by means of an electroacoustic transducer.

The audio system 10d presented in FIG. 13 is used for a conversion of an input audio signal Sin into an audio signal on the basis of which it shall be possible to faithfully reproduce this input audio signal Sin by means of an electroacoustic transducer u. The audio system 10d comprises an input dynamic electroacoustic transducer r serving as a microphone that when excited by an acoustic signal Sin generates at its electrical output an original analog audio signal ASa. Subsequently this original analog audio signal ASa is subjected to the method of a correction according to the present invention in the correction block 2 of an analog signal processor ASP. The correction block 2 is the block 2 presented in FIG. 9, in which the original analog audio signal ASa is transformed into a corrected analog audio signal CASa according to the formula I:

$$CASa(t) = ASa(t) + B \int ASa(t)dt + C\frac{dASa(t)}{dt}, \qquad (I)$$

in which the coefficient B amounts from −10 to 0, preferably amounts from −5 to −1, and particularly preferably amounts about −3.2; and the coefficient C amounts from 0 to 0.04, preferably amounts from 0.005 to 0.020; and particularly preferably amounts about 0.01. Furthermore the ratio of the coefficient B to the coefficient C preferably amounts from −50 to −1000, and more preferably amounts from −250 to −350. Subsequently such a corrected audio signal CASa may be for example converted by a transmitting unit TU into a radio signal transmitted to a number of receiving units RU (for example radio receivers). The receiving units RU provided with output transducers u (loudspeakers) may directly reproduce sound with high fidelity on the basis of the received radio signal without further need of audio signal correction, that has already been centrally and comprehensively realized at the side of the transmitting unit TU. The output acoustic signal Sout generated by the output transducer u constitutes a very faithful reproduction of the original input acoustic signal Sin.

In alternative embodiments, instead of transmitting the corrected audio signal CASa to remote locations, this signal may be also obviously reproduced directly in a local audio system. For example the voice of an opera singer may be being recorded as the corrected audio signal on the basis of which the opera singer voice may be being reproduced practically in a real time with high fidelity by the local opera audio system.

Figure 14:
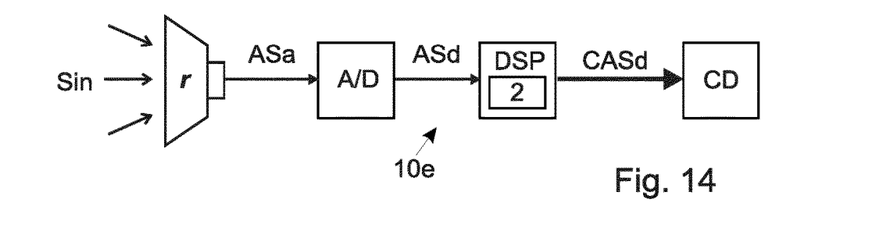
FIG. 14 presents schematically an exemplary audio system for a realization of the acoustic signal recording method according to the present invention in the form of an audio signal using an electroacoustic transducer.

The audio system 10e of FIG. 14 is used for a recording of an input audio signal Sin into an audio signal on the basis of which it shall be possible to faithfully reproduce this input audio signal Sin by means of an audio system provided with an output electroacoustic transducer. The input electroacoustic transducer r (a microphone) converts an input audio signal Sin into its electric representation constituting an analog voltage audio signal ASa. Subsequently in an analog-to-digital converted A/D this original analog audio signal ASa is converted into its digital representation ASd, that in turn is subjected to the correction according to the present invention on the basis of the formula I:

$$CASd(t) = ASd(t) + B \int ASd(t)dt + C\frac{dASd(t)}{dt}, \quad (I)$$

in which the coefficient B amounts from −10 to 0, preferably amounts from −5 to −1, and particularly preferably amounts about −3.2; and the coefficient C amounts from 0 to 0.04, preferably amounts from 0.005 to 0.020; and particularly preferably amounts about 0.01. Furthermore the ratio of the coefficient B to the coefficient C preferably amounts from −50 to −1000, and more preferably amounts from −250 to −350. This operation is carried out in the correction block 2 constituting the block 2 of FIG. 9 implemented in a digital signal processor DSP. At the output of the processor DSP a corrected digital audio signal CASd is obtained on the basis of which it shall be possible to reproduce the original acoustic signal Sin with high fidelity using an electroacoustic transducers. Finally the output corrected audio signal CASd is stored on any arbitrary storage medium, such as for example an optical disc.

In alternative realizations of the present invention, in place of the above described signal processors ASP and DSP it is also possible to employ any other arbitrary electric and/or electronic systems (active and/or passive means), and/or hardware and/or software means, enabling for a realization of the audio signal AS correction into the corrected audio signal CAS according to the formula I on which the present invention is based.

The invention claimed is:

1. A method for adjusting audio systems using an electroacoustic transducer (u), the method comprising:
    providing an audio system with an electroacoustic transducer (u);
    determining an amplitude-frequency transmission characteristic of the electroacoustic transducer (u);
    detecting an audio signal (AS) constituting a sound source (s);
    determining an amplitude-frequency transmission characteristic of the audio signal (AS);
    determining a modification function by minimizing the difference between the amplitude-frequency transmission characteristic of the electroacoustic transducer (u) and the amplitude-frequency transmission characteristic of the audio signal (AS);
    creating a modified audio signal (CAS) by applying the modification function to the detected audio signal (AS), wherein the modification function comprises a proportional part, an integral part and a derivative part and the application of the modification function to the detected audio signal (AS) resulting in the following formula:

$$CAS(t) = AS(t) + B \int AS(t)d(t) + C\frac{dAS(t)}{dt}$$

and wherein the coefficients B and C are determined by minimizing the difference between the amplitude-frequency transmission characteristic of the electroacoustic transducer (u) and the amplitude-frequency transmission characteristic of the audio signal (AS).

2. The method according to claim 1, wherein
the coefficient B amounts from −10 to 0 and
the coefficient C amounts from 0 to 0.04.

3. The method according to claim 1, wherein
the coefficient B amounts from −5 to −1
the coefficient C amounts from 0.005 to 0.020.

4. The method according to claim 1, wherein
the coefficient B amounts to −3.2 and
the coefficient C amounts to 0.01.

5. The method according to claim 1, wherein
the ratio of the coefficient B to the coefficient C amounts from −50 to −1000.

6. The method according to claim 1, wherein
ratio of the coefficient B to the coefficient C amounts from −250 to −350.

7. The method according to claim 1, wherein
ratio of the coefficient B to the coefficient C amounts from −250 to −350.

8. The method according to claim 1, wherein the corrected audio signal (CAS) is amplified for producing an electric control signal (ECS).

9. The method according to claim 8, wherein the audio signal (AS) is stored on an additional storage medium.

10. The method according to claim 8, wherein an acoustic signal (Sout) is formed from the audio signal (AS) by using the electroacoustic transducer (u).

11. The method according to claim 1, wherein the audio signal (AS) is supplied by a storage medium.

12. The method according to claim 1, wherein the audio signal (AS) is formed from an acoustic signal (Sin) by using an additional electroacoustic transducer (r).

\* \* \* \* \*